O. T. AUSTINSON.
ADJUSTABLE LIVE STOCK STANCHION FOR WAGONS.
APPLICATION FILED DEC. 2, 1909.
956,791.
Patented May 3, 1910.
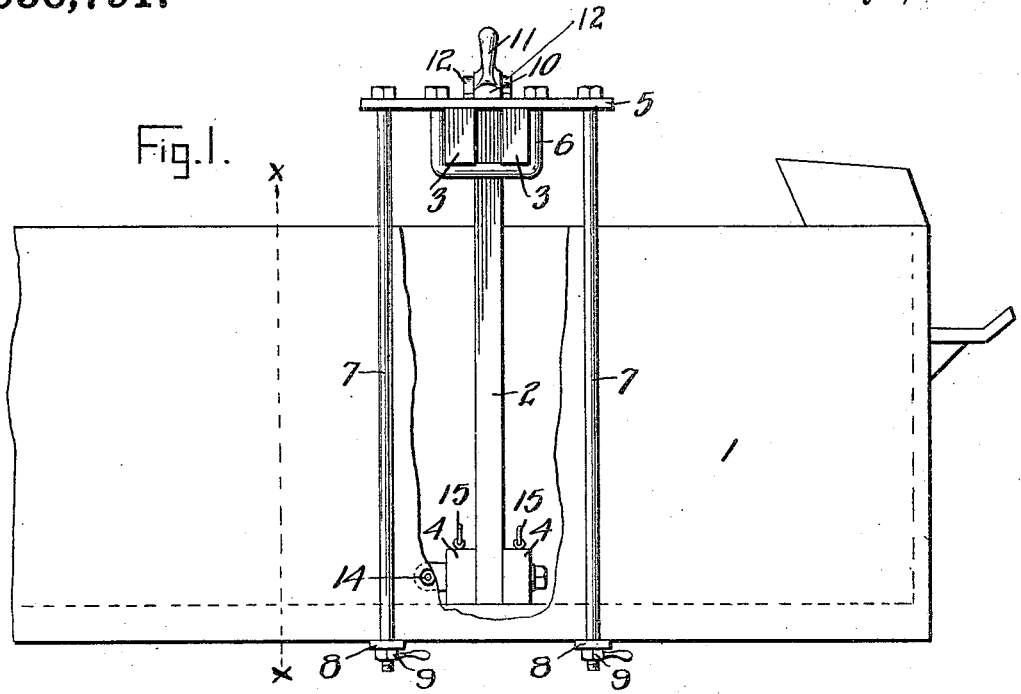
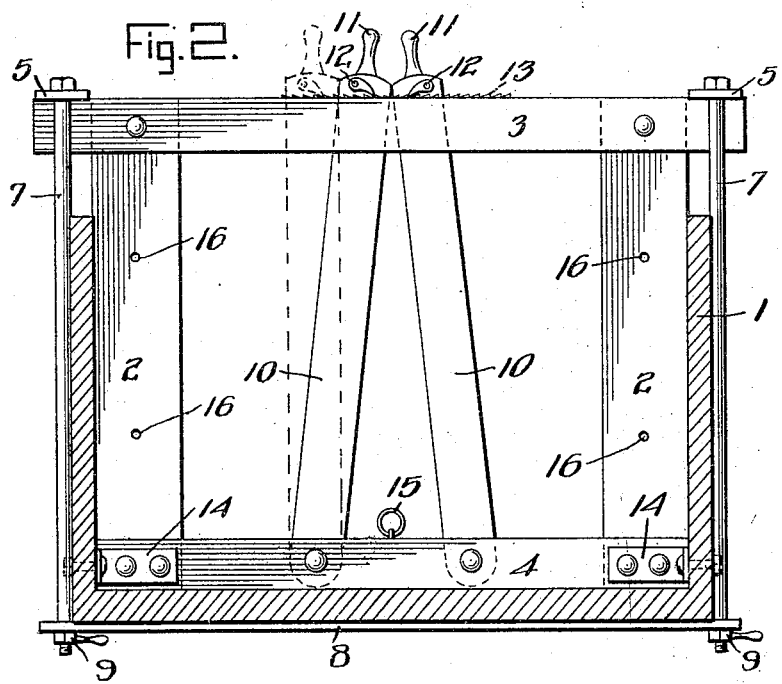
Witnesses
C. F. Reichenbach.
H. H. Rockwell
Inventor
Oliver T. Austinson.
By C. Page Jones.
Attorney

UNITED STATES PATENT OFFICE.

OLIVER T. AUSTINSON, OF LYLE, MINNESOTA.

ADJUSTABLE LIVE-STOCK STANCHION FOR WAGONS.

956,791.  Specification of Letters Patent.  Patented May 3, 1910.

Application filed December 2, 1909. Serial No. 530,901.

*To all whom it may concern:*

Be it known that I, OLIVER T. AUSTINSON, citizen of the United States, residing at Lyle, in the county of Mower and State of Minnesota, have invented certain new and useful Improvements in Adjustable Live-Stock Stanchions for Wagons, of which the following is a specification.

My invention relates to attachments for wagons, and more particularly to wagon bodies.

The object of my invention is to provide a device that may be readily attached to, and detached from, any wagon body of ordinary construction, that will securely hold an animal in the wagon and prevent its being injured by jolting of the wagon, and one whereby an animal may be easily, quickly and securely fastened and readily released.

A further object is to provide a device of this character that is simple in construction, durable, and cheap of manufacture, and one that can be allowed to remain fastened to the wagon body when not in use, if desired, and the wagon utilized for other purposes.

With these and other objects in view, the invention consists of certain novel features of construction, and arrangement of parts, as will be more fully described, and pointed out in the claims.

In the accompanying drawing, Figure 1 is a side elevation of a wagon, partly broken away, with my device attached thereto. Fig. 2 is a vertical transverse section through the wagon body on lines $x$—$x$ of Fig. 1.

The same numerals refer to corresponding parts in all of the figures.

Referring to the drawings by numeral, 1 denotes a wagon body, upon which my stock-holding device is detachably secured. The said device is constructed in the form of an oblong frame, and is adapted to be secured transversely in an upright position and at any desired point in the wagon body. It consists of vertical members, 2, 2, which are disposed against the sides of the body and form the sides of the frame, and horizontal members, 3, 3, and 4, 4, which form the top and bottom thereof, respectively. The said top members 3, 3, are bolted, adjacent to their ends, to each side, and at the upper ends, of the said vertical members, and the members 4, 4, are secured in a similar manner to each side, and at the lower ends, of the said vertical members, and rest on the floor or bed of the wagon-body.

The ends of the top members 3, 3, of the device, extend beyond the vertical members 2, 2, and the sides of the wagon body, and have secured to their upper faces, adjacent the ends thereof, cross pieces 5, 5, by means of U-shaped rods 6, 6, which extend around the members 3, 3, and through apertures in the said cross pieces and are securely fastened by means of nuts, as shown. These U-shaped rods serve for securing the sections 3, 3, as well as holding the cross pieces 5, 5, firmly in place.

Vertical brace rods, 7, 7, two on each side of the wagon body, have their upper screw threaded ends removably secured, by means of nuts, in apertures formed in the ends of the cross pieces 5, 5. The said brace rods extend downwardly on the outside of and beyond the bottom of the wagon body, and have their lower screw threaded ends connected together by means of retaining bars 8, 8, which extend across and beneath the wagon body. The said retaining bars have apertures in their ends to receive the screw threaded ends of the brace rods 7, 7, and are held in place by means of the wing-nuts 9, 9.

Adjustable stanchions, 10, 10, operate in the spaces formed between the members 3, 3, and 4, 4, and have their lower ends pivotally secured between the latter members a suitable distance apart. The said stanchions are provided on their upper ends with handles 11, 11, and have secured adjacent thereto pawls 12, 12, which engage teeth or notches 13, 13 on the upper faces of the horizontal members 3, 3.

To more firmly hold the device in position, I have provided angle irons 14, 14, which are fastened to the outer face, adjacent to each end, of one of the lower horizontal members 4, 4. These angle irons are secured to the wagon body by bolts, which pass through openings formed in the sides of the body and are secured by nuts on the outside thereof, as shown in dotted lines.

Rings 15, 15 are placed in the center of the lower horizontal members, through one of which a rope may be passed to draw the animal's head through the stanchions. The rope may then be tied to the ring, if necessary, to more securely hold the animal.

In operation, it will be seen that the device may be readily attached to any wagon body of ordinary construction, by simply placing it upright across the body in the desired position, having first removed the retaining bars 8, 8, and allowing the brace rods 7, 7, to pass on the outside of the body. The retaining bars are then secured to the lower ends of said brace rods, by means of wing-nuts, which are screwed up tight, thus firmly clamping the stanchion device down into the wagon body. The angle irons 14, 14 are then secured to the sides of the body, as heretofore described. To detach the device all that is necessary is to remove the bolts holding the said retaining bars and angle irons and lift it out of the wagon.

In order to secure an animal in the wagon, after my device has been placed in position, the stanchions 10, 10, are thrown apart to form an opening sufficiently large to admit the head of the animal. A rope attached to the head of the animal is passed through the ring nearest the front of the wagon and the animal's head drawn through the opening between the stanchions, when the said stanchions are brought near enough together to prevent the animal from withdrawing its head, the pawls on the stanchions holding them locked in their adjusted positions.

On account of my device occupying but little space in the wagon, it will be found advantageous to allow it to usually remain in position, on account of its bracing the sides of the body when the wagon is used in hauling grain, etc., and in this connection I have formed apertures 16, in the upright members 2, 2, through which may be passed bolts to secure boards, not shown, of suitable size, thereto, for the purpose of closing the openings between the sections of the device, thus forming a partition dividing the wagon body into two compartments, which may be used for hauling grain and other products at the same time. The device can be adjusted to form compartments of any desired size, the angle irons not being needed for this purpose.

It will be readily understood that various modifications may be made in connection with my invention without departing from the spirit and purpose thereof; for instance, a series of stanchions may be employed, in order to secure a number of animals. It will also be understood that two animals may be held by my device as shown, by using the outer openings in the frame next to the vertical members 2, 2, and properly adjusting the stanchion bars 10, 10. For this purpose pawls and teeth or notches are arranged on both sides of the stanchions 10, 10, to permit using either the central opening or the two side openings, the pawls not in use being thrown out of engagement with their teeth or notches.

Having thus described my invention, what I claim and desire to secure by Letters Patent of the United States, is:

1. The combination with a wagon body, of an adjustable partition having a stanchion for holding live-stock, and means for adjustably clamping it to the body, substantially as described.

2. In combination with a wagon body, a stanchion device having vertical members connected at top and bottom with cross pieces, adjustable stanchions for holding live-stock operating between said cross pieces, and suitable means for detachably securing said device transversely in a wagon body, substantially as described.

3. A device for holding live-stock in wagons, consisting of upright members at each side of the wagon body, connected at bottom by cross pieces resting on the floor and at top by cross pieces projecting over the sides of the body, adjustable stanchions between said cross pieces, transverse arms fastened to the ends of the said top cross pieces and secured thereto by means of U-shaped rods, and brace rods on the outside of the wagon body having their upper ends secured to the said transverse arms and their lower ends removably connected together by rods passing under the wagon body, substantially as described.

In testimony whereof I affix my signature in presence of two witnesses.

OLIVER T. AUSTINSON.

Witnesses:
　THEO. T. AUSTINSON,
　AUSTIN A. AUSTINSON.